June 3, 1924.　　　　　　　　　　　　　　　　　　　1,496,036
F. J. TONE
REGENERATOR
Filed Aug. 24, 1922
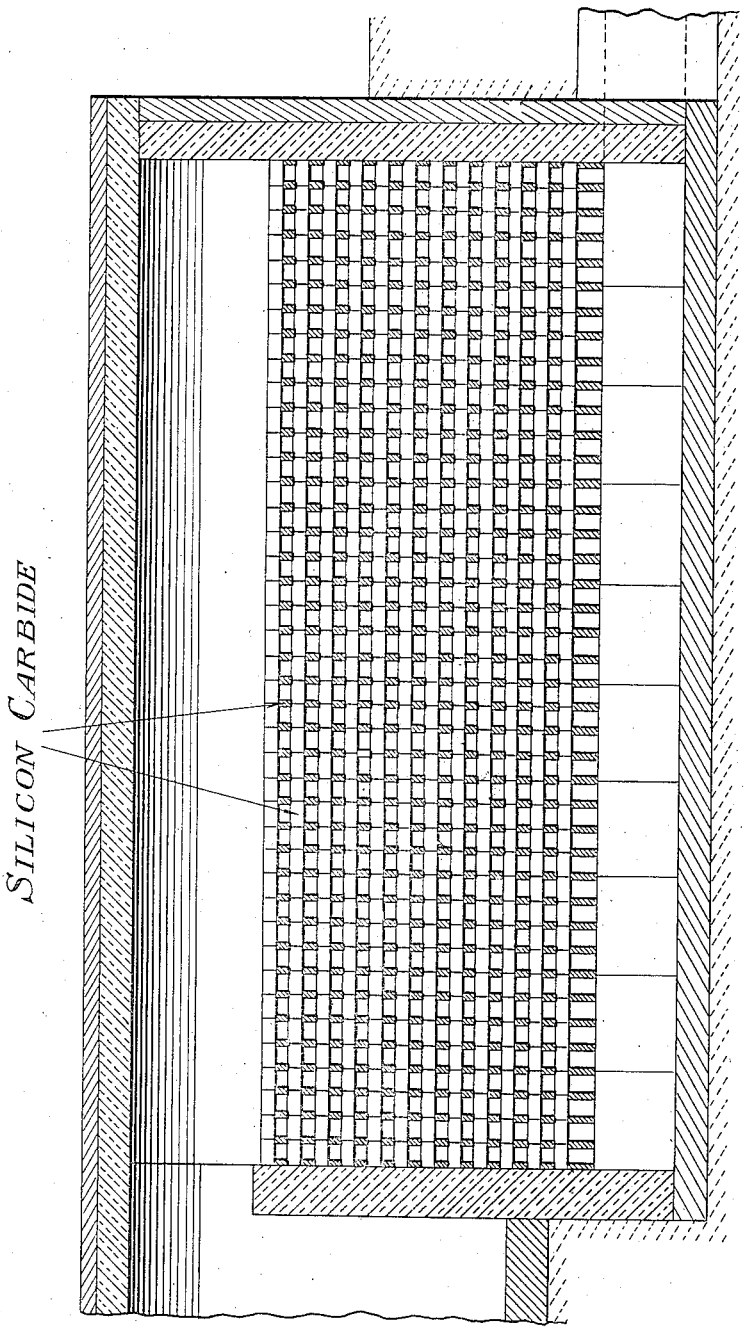
INVENTOR
Frank J. Tone
by his attorneys
Byrnes Stebbins & Parmelee Patented June 3, 1924.

1,496,036

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REGENERATOR.

Application filed August 24, 1922. Serial No. 584,116.

*To all whom it may concern:*

Be it known that I, FRANK J. TONE, a resident of Niagara Falls, Niagara County, New York, have invented a new and useful Improvement in Regenerators, of which the following is a full, clear, and exact description, reference being had to the accompanying drawings, forming part of this specification, in which:

The drawing is a vertical section through a regenerator embodying the invention.

This invention relates to refractory structures known as regenerators which are used for pre-heating air or gas in the operation of certain types of heating furnaces. A regenerator unit consists of a mass of checkerwork, composed usually of firebrick so constructed that gases can pass through freely in either direction. The regenerator consists of two units.

During the first cycle, the cold gases pass through the hot regenerator and absorb heat from it, after which combustion takes place. The gases after combustion pass out of the heating chamber and through the other unit of the regenerator through which they give up sensible heat. In the second cycle, the direction of gas is reversed and the cold gases pass through the second unit which is now in a highly heated state. The gases are heated in the passage through this unit and after combustion are passed through the first unit giving up sensible heat. The function of the regenerator is in the first half of the cycle to give up heat to the colder gases and in the second half of the cycle to absorb and store up heat from the hot gases.

My invention relates to the use of silicon carbide as a refractory absorbing and emitting medium in the regenerator and when used in the proper form it greatly increases the capacity of the regenerator and the fuel economy of the furnace.

I have discovered that certain properties of silicon carbide function together in a way to give most efficient results when used for this purpose. These properties are (1) emissivity, (2) thermal conductivity, and (3) low coefficient of expansion.

The emissivity factor of a substance is the measure of its capacity to take up heat at the surface where it comes in contact with the substance carrying the heat, and likewise the factor which represents its capacity to similarly give up this heat at its surface to a colder medium, the factor being the same in each case. The emissivity factor of silicon carbide at 1000° C. is 0.10 gram calories per square centimeters per second or about two times greater than that of firebrick. This means that when silicon carbide is in contact with colder gases it will, other things being equal, take up the heat from the gases two times faster than fireclay and likewise will emit the heat to colder gases at the same relative rate. It is apparent that this factor is of prime importance in a regenerator material.

The second property of silicon carbide which fits it for regenerators is its thermal conductivity. The thermal conductivity of bonded silicon carbide is about .0205 at 1000° C.; that of fireclay is about .0032 and of silica brick about .0042. The thermal conductivity of silicon carbide refractories is therefore about five times that of the other fireclay refractories commonly used for this purpose. The regenerator material having taken up heat from the hotter gases in contact with it must absorb this heat into its interior mass, and therefore, the heat must be conducted from the surface into the interior. The faster the heat is conducted into the interior of the mass, the more heat will be absorbed at the surface and the reverse is also true that the more rapidly the heat is conducted from the interior to the surface, the more rapidly will the heat be emitted at the surface, other factors being equal. This factor therefore plays an important part in regenerator material.

The refractory material composing regenerators is subjected to very great stresses due to alternate heating and cooling. Silicon carbide refractories having a low coefficient of expansion are specially fitted for this hard service and do not crumble and spall under conditions of sudden changes in temperature. Under tests for spalling loss, silicon carbide brick show less loss than fireclay bricks, or in fact, any other class of commercial refractories.

Silicon carbide refractories have a high mechanical strength and a high modulus of rupture at regenerator temperatures. They are therefore well adapted for making a very durable permanent structure.

The drawing illustrates the usual type of furnace regenerator showing the silicon carbide checkerwork in section. The flow through the regenerator of the products of combustion and the air which is to be reheated takes place in the usual way, and it is readily understood by those skilled in the art, and no further detail description thereof is deemed necessary.

The term "silicon carbide" is used herein as a term of general definition and not of limitation, and is intended to include refractories of silicon carbide in admixture with other materials, such for example, as bonding materials.

I claim:

1. A regenerator having silicon carbide heat-storing material.

2. A regenerator having silicon carbide checkerwork.

3. A regenerator having silicon carbide units arranged to absorb, store and admit heat.

In testimony whereof I have hereunto set my hand.

FRANK J. TONE.